UNITED STATES PATENT OFFICE.

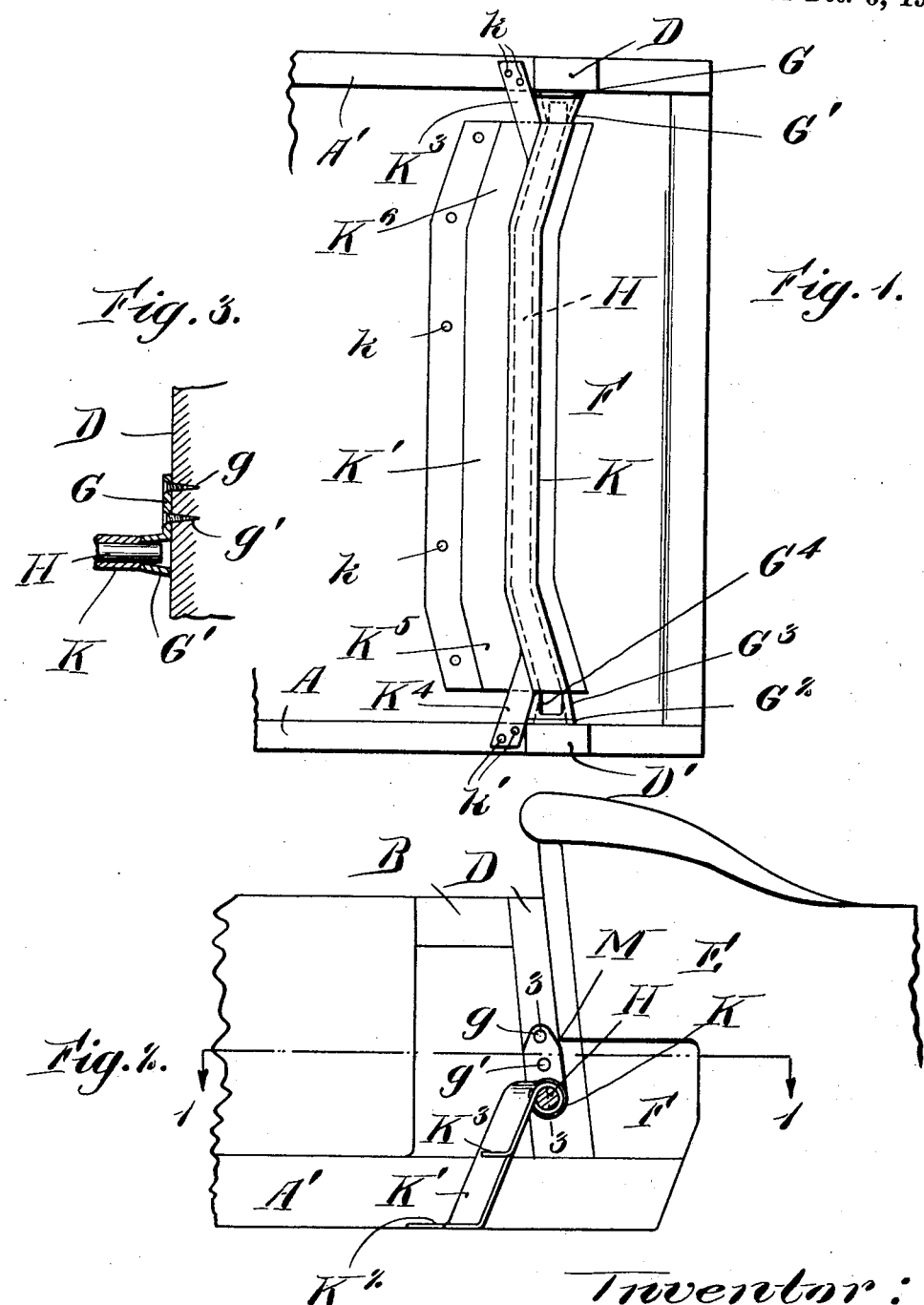

JOHN C. JONES, OF BROOKLINE, MASSACHUSETTS.

VEHICLE.

1,399,348.  Specification of Letters Patent.  Patented Dec. 6, 1921.

Application filed August 11, 1920. Serial No. 402,826.

*To all whom it may concern:*

Be it known that I, JOHN C. JONES, a citizen of the United States, and resident of Brookline, in the county of Norfolk and State of Massachusetts, have invented a new and useful Improvement in Vehicles, of which the following is a specification.

The main object of my invention is to provide a combination storage compartment and foot-rest and my invention has particular adaptability to automobiles in which foot-rests are very desirable, if not necessary, and in which it is common to carry packages in great variety.

A feature of my invention is a foot rest which also serves as the wall of a storage compartment and this is due not only to the construction which I use but also to the location with reference to other parts of the vehicle.

A feature of my invention is that it may be made and sold as an article of manufacture in the form of an attachment.

Other features will be pointed out below.

In the drawings—

Figure 1 is a partial plan on the line 1—1 of Fig. 2 of an automobile embodying my invention;

Fig. 2 is a partial elevation of the same; and Fig. 3 is a detail described below, taken in section on line 3—3 of Fig. 2.

I have illustrated a portion of the body of a Ford touring car in which are the longitudinal bottom pieces A A', one at each side of the body, the top longitudinal piece B, the uprights D and D' and the front seat E, the latter being undercut at F so as to provide a comparatively large space beneath the seat and above the floor of, and extending across, the automobile.

To the upright D I attach, as by screws $g$ $g'$, a plate G having an integral tubular or socket portion G' and I attach a similar plate $G^2$ and tubular portion $G^3$ to the other upright. Those tubular portions receive, and act as a support for, the rod H, which may be sprung into them, or one of them as $G^3$ may have a slot $G^4$ at the top so that one end of rod H may be inserted lengthwise in portion G' and the other end of the rod may be dropped through the slot $G^4$ into portion $G^3$.

Around rod H is bent the end K of a sheet metal plate, which extends downwardly at K' toward the rear of the car and ends in the horizontal portion $K^2$, the latter portion being, if desired, attached by screws $k$ to the floor of the car. Portion K' has integral wings $K^3$ and $K^4$ extending outwardly and bent horizontally, the horizontal portions being attached by screws $k'$ to the tops of the pieces A A'.

My foot-rest and the members G and $G^2$ may be readily attached and detached and may be sold apart from the vehicle as articles of manufacture.

I prefer to have the ends $K^5$ and $K^6$ of the sheet metal plate and also the ends of rod H bent toward the front of the car so that they will not be in the way of a person entering the car and yet this construction permits me to have the central portion of the foot-rest sufficiently rearwardly located so as to be at the proper place for a brace for the feet and at the proper place to give a large storage compartment F with a suitably large entrance to said compartment between the rod H and the portion M of the seat E.

It will be observed that the rear wall for the storage compartment F is provided by the foot-rest member K' which extends substantially entirely across the car and in the form shown, which is the form I prefer. This wall is continuous.

I may use the storage compartment to hold packages, umbrellas or any other desired articles and in the particular form shown the overhanging portion of the seat E forms a roof for the compartment which tends to prevent the packages from being thrown upwardly on account of jounces in riding.

What I claim is:

1. A vehicle having a storage compartment and a foot-rest, the latter serving as a wall for said compartment, the ends of the foot-rest extending forwardly with relation to the center of the foot-rest.

2. A vehicle comprising a storage compartment; two socket bearings, one at each side of the car; a rod supported by said sockets; and a foot-rest member supported by said rod and forming a wall for said compartment.

3. A device of the character described comprising a front seat; a storage compartment located beneath the front seat; a foot-rest including a rod having fixed connection with the sides of the vehicle and a wall connected to and extending downwardly from, said rod substantially to the floor of said compartment and forming the rear wall of said compartment, said rod and wall being normally spaced from the front seat so as to give access to said compartment.

4. As an article of manufacture a foot-rest comprising a rod; two socket bearings, one to receive each end of said rod, said bearings being adapted for connection to the side walls of the vehicle; and a sheet metal member bent around said rod and extending downwardly and rearwardly and having wings for connection to the sides of the vehicle.

5. A device of the character described comprising a front seat; a storage compartment located beneath the front seat; a permanent floor forming the bottom of said compartment; a foot-rest including a rod extending across the car and connected to the sides of the car and including a wall connected to said rod and extending downwardly from said rod substantially to said floor, said wall extending substantially across the vehicle and forming the rear wall for said compartment, said rod and wall being normally spaced from the front seat a sufficient distance to give access to said compartment.

JOHN C. JONES.